(12) United States Patent
Logan et al.

(10) Patent No.: US 6,427,449 B1
(45) Date of Patent: Aug. 6, 2002

(54) COMPACT VOLATILE ORGANIC COMPOUND REMOVAL SYSTEM

(75) Inventors: Mark A. Logan, Pleasant Valley; Lloyd F. Wright, Hopewell Junction, both of NY (US)

(73) Assignee: Solid State Cooling Systems, Pleasant Valley, NY (US)

( * ) Notice: Subject to any disclaimer, the term of this patent is extended or adjusted under 35 U.S.C. 154(b) by 0 days.

(21) Appl. No.: 09/739,458

(22) Filed: Dec. 15, 2000

(51) Int. Cl.⁷ .................................................. F25B 21/02
(52) U.S. Cl. ............................................. 62/3.4; 62/3.2
(58) Field of Search ...................... 62/3.4, 3.2

(56) References Cited

U.S. PATENT DOCUMENTS

| | | | | |
|---|---|---|---|---|
| 5,737,674 A | * | 4/1998 | Venkatesan et al. | 399/250 |
| 5,761,908 A | * | 6/1998 | Oas et al. | 62/3.2 |
| 5,866,752 A | * | 2/1999 | Goozner | 588/227 |
| 6,076,357 A | * | 6/2000 | Holdren et al. | 62/3.2 |
| 6,289,888 B1 | * | 9/2001 | Welles | 126/263.01 |

* cited by examiner

Primary Examiner—William C. Doerrler
Assistant Examiner—Mark Shulman
(74) Attorney, Agent, or Firm—Gary T. Aka

(57) ABSTRACT

A compact, volatile organic compound removal system is presented. The system has a metal condensation plate and a cooling source in intimate thermal contact with the metal condensation plate. The metal condensation plate has a channel formed in the plate, an inlet in the condensation plate for introducing a gas carrying volatile organic compound vapors into the channel, a high surface area metallic structure, such as foamed metal or metallic fins, in intimate contact with the walls of the channel, an outlet in the condensation plate for removing the gas from the channel and a drain in the condensation plate for removing volatile organic compound condensates from the channel. The cooling source cools the channel walls and the high surface area metallic structure so that the volatile organic compound vapors condense on the high surface area metallic structure to be removed from the gas.

16 Claims, 3 Drawing Sheets

COMPACT VOLATILE ORGANIC COMPOUND REMOVAL SYSTEM

BACKGROUND OF THE INVENTION

The present invention is related to systems for removing volatile organic compounds from effluents and, more particularly, to systems for removing volatile organic compounds from the effluents of a semiconductor fabrication facility.

Many processes used in the fabrication of semiconductor devices require subsequent cleaning steps with organic solvents or the use of an alcohol to dry the device by removing water and producing a hydrophobic surface. Removal of these organic compounds from a semiconductor wafer surface usually requires directing a gas, such as nitrogen, to flow across the wafer surface. The resulting effluent gas stream is laden with volatile organic compounds (hereafter termed VOCs). If released into the atmosphere, these volatile organic compounds can react with sunlight to produce photochemical smog or can cause other environmentally detrimental effects.

As a result, environmental regulations strictly limit the amount of VOCs which may be released into the air. It is desirable, then, to remove a high percentage of these VOCs prior to releasing these effluent gas streams into the air. It is further desirable that a VOC removal system be flexible in operation to allow a wide range of inlet gas of flow rates and VOC concentrations, so the cleaning or drying processes are not impaired nor compromised.

A previous VOC removal technique has been the use of an absorption medium, such as activated carbon, to remove the VOCs. However, this technique has the disadvantage of creating a solid waste product which must then be disposed of at substantial cost.

A better approach is to remove the VOC vapor by condensation. It is much more desirable because the resulting liquid may be recycled at much lower cost. However, the problem in most condensation systems is the formation of fog, which consists of very tiny droplets of the VOC. Such tiny droplets do not settle out of gas streams, but remain suspended within it. The fog droplets also flow with moving air streams and avoid contact with solid surfaces. As a result, the removal of fog droplets is notoriously difficult. Fog forms when a gas stream is cooled below the dew point of its condensable vapor constituents. Fog formation is common when a gas stream containing condensable vapors is cooled in a condensing unit with a low surface area-to-volume ratio.

On the other hand, the present invention provides for a volatile organic compound removal system which has an extremely high surface area to volume ratio. The system also has good thermal conductivity to assure that the surfaces are cooled appropriately to condense the VOCs.

SUMMARY OF THE INVENTION

The present invention provides for a compact, volatile organic compound removal system. The system comprises a metal condensation plate and a cooling source in intimate thermal contact with the metal condensation plate. The metal condensation plate has a channel formed in the plate, an inlet in the condensation plate for introducing a gas carrying volatile organic compound vapors into the channel, a high surface area metallic structure in intimate contact with the walls of the channel, an outlet in the condensation plate for removing the gas from the channel and a drain in the condensation plate for removing volatile organic compound condensates from the channel. The cooling source cools the channel walls and the high surface area metallic structure so that the volatile organic compound vapors condense on the high surface area metallic structure to be removed from the gas. Foamed metal works effectively as the high surface area metallic structure. Alternatively, metal fins can also work as the high surface area metallic structure.

DESCRIPTION OF THE SPECIFIC EMBODIMENTS

One embodiment of the present invention is illustrated by the assembly in FIG. 1. A condensation plate 31 which receives the gas carrying the VOCs is fixed between two cold plates 32. A cold plate or heat transfer plate, such as described in U.S. Pat. No. 6,032,726, which issued Mar. 7, 2000 and is assigned to the present assignee, is typically a flat metal plate in contact with a flowing fluid. The fluid, normally a liquid, carries heat from (or to) the thermally conductive metal plate for cooling (or heating) purposes. It should be noted that the cold plate illustrated in the cited patent, which is incorporated by reference herein, is an example of a cold plate which might be used in the described assembly. Other cold plates may also be used.

Figure 1A:
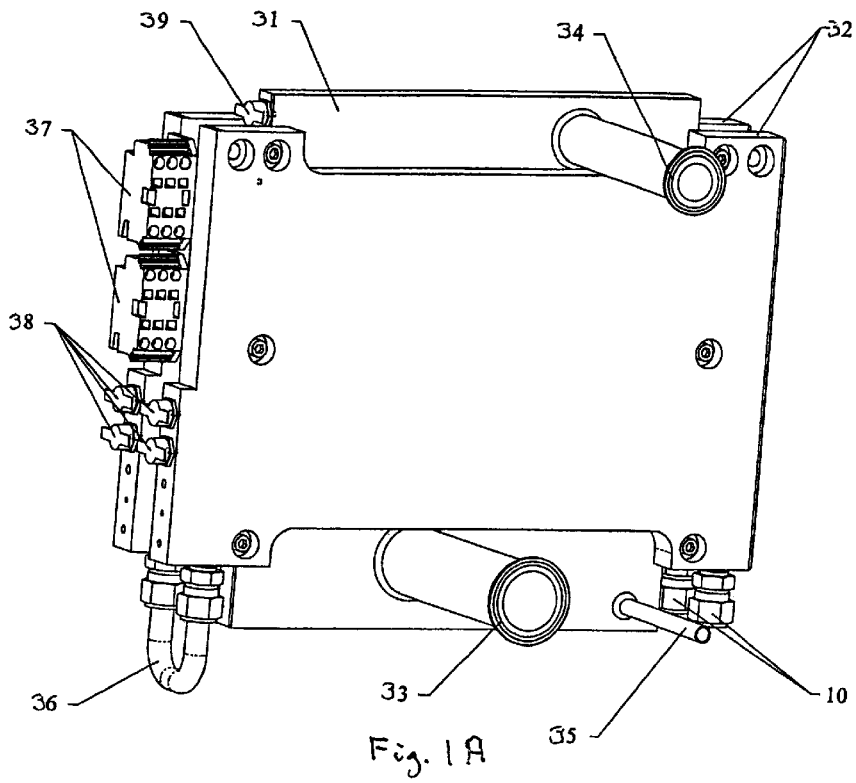
FIGS. 1A and 1B are opposing perspective views of an assembly of a volatile organic compound removal system, according to one embodiment of the present invention.
Figure 1B:
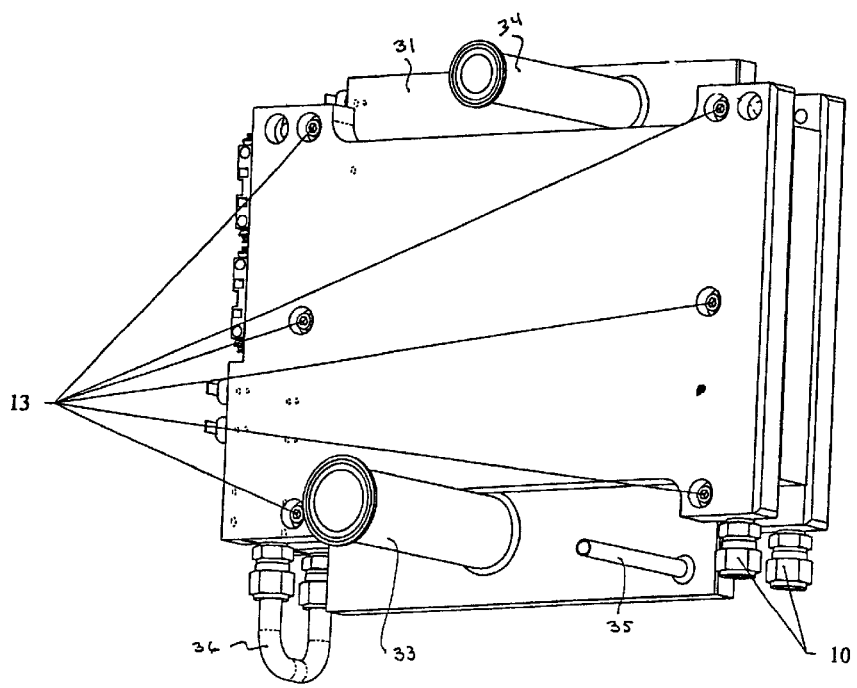
Figure 2:
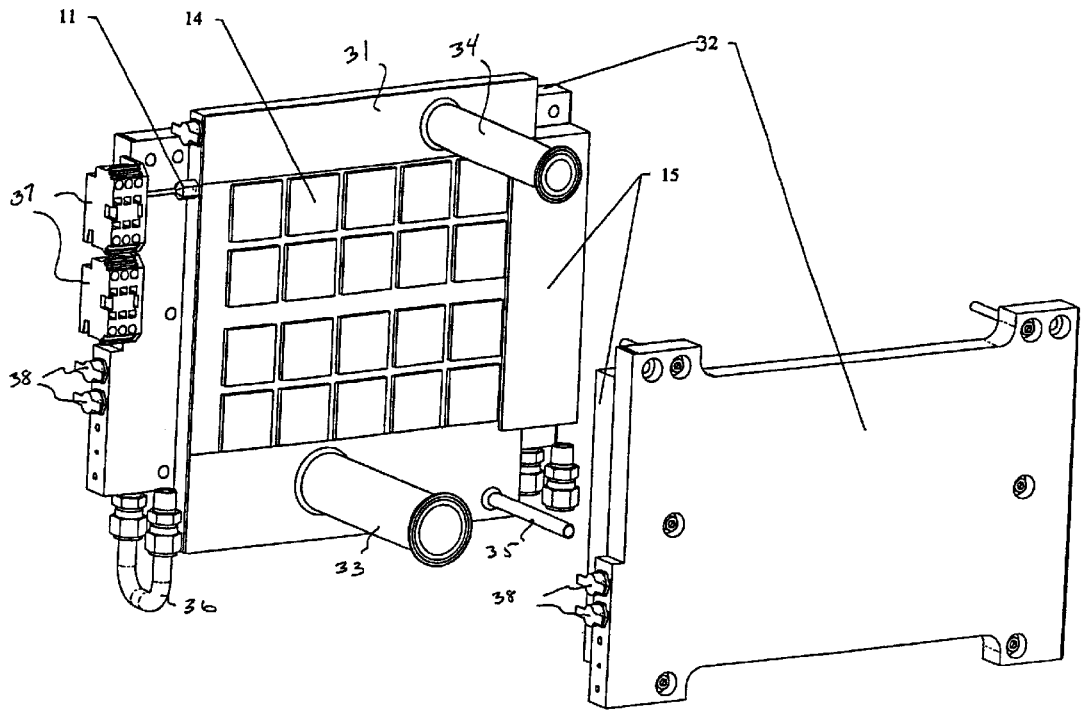
FIG. 2 is an exploded view of the volatile organic compound removal system of FIGS. 1A and 1B.

In the assembly of FIGS. 1A and 1B, the two liquid cold plates 32 are plumbed together with a U-tube 36 to simplify the connection of cooling water to the cold plate inlet and outlet connections 10. Snap disc thermostats 38 in the cold plates 32 protect against operation without the cooling water. As shown by the exploded view in FIG. 2, between each cold plate 32 and the condensation plate 31 are thermoelectric modules 14 which transfer heat from the condensation plate 31 to each cold plate 32. Electrical connections to the thermoelectric modules 14 are made through electric connectors 37. The thermoelectric modules 14 cool the condensation plate 31 from both sides and inject the heat from the condensation plate 31 into the two liquid cold plates 32 for removal from the system. The entire assembly is clamped together by bolts 13 and Belleville disc springs (not shown in the drawings) which are tightened to a specific torque to properly compress the thermoelectric modules 14 to the condensation plate 31 and the liquid cold plates 32. A thermally conductive grease or other compound between the condensation plate 31 and liquid cold plates 32 ensures good thermal contact. Insulation 15 increases the efficiency of the thermoelectric modules 14.

The condensation plate 31 has a gas inlet tube 33, a gas outlet tube 34 and a drain tube 35. A gas stream containing the VOCs enters the condensation plate 31 though the inlet tube 33 and the gas stripped of the VOCs exits the condensation plate 31 through the outlet tube 34. The condensed VOCs drain out of the condensation plate 31 through the drain tube 35. The condensation tube 31 also has a temperature probe 11 (shown in FIG. 2) for the gas stream exiting the condensation plate 31 to control or monitor the exit gas temperature and thus the VOC dew point/concentration in the condensation plate 31.

An alternate arrangement removes the thermoelectric modules 14. Rather than cooling water, a refrigerant is pumped through the liquid cold plates 32 which are placed in direct contact with the condensation plate 31. Still another arrangement does away with cold plates. Instead, the refrigerant is pumped through metallic tubes which are in intimate thermal contact to the outside surfaces of the condensation plate 31.

Figure 3A:
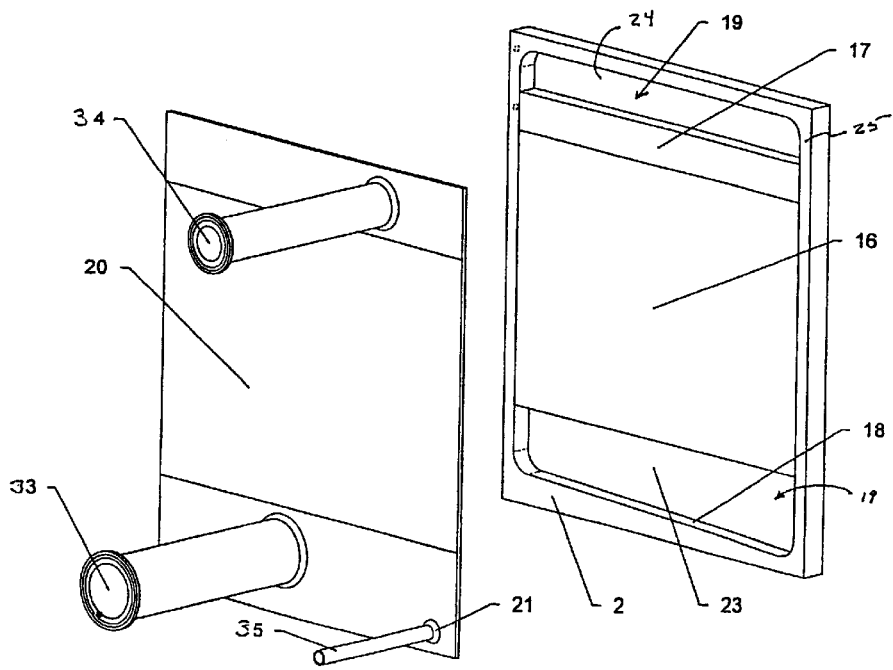
FIG. 3A is a detailed view of the condensation plate in the volatile organic compound removal system of FIGS. 1A and 1B.

A preferred embodiment of the condensation plate 31 is shown in FIG. 3A. The plate 31 is formed by a metallic base plate 22 and a cover plate 20 which are brazed together. The metallic base plate 22 has a machined cavity forming a channel 19, which holds two sections 16 and 17 of foamed metal. The section 16 is fixed by brazing in the machined channel 19 near the gas inlet tube 33 when the metallic base plate 22 and the cover plate 20 are joined. The space in the machined channel 19 opposite the gas inlet tube 33 forms a plenum 23 so that the incoming gas is distributed evenly across the width of the foamed metal section 16. The bottom boundary 18 of the plenum 23 is angled to remove the condensed VOCs, as discussed below. The section 16 has a particular surface area-to-volume ratio. In the case of foamed metal, the ratio is determined by a pore per inch (ppi) density. A ppi of 10 has been found work effectively for isopropyl alcohol as the VOC. The foamed metal section 17 of higher surface area-to-volume is fixed in the machined cavity 19 just above, and between, the foamed metal section 16 and the opening to the gas outlet tube 34. The space in the machined channel 19 opposite the gas outlet tube 34 forms a manifold 23 so that the gas leaving the section 17 collects in the manifold for exhaust through the gas outlet tube 34. For the section 17, a ppi of 40 has been found to effectively with the section 16 of 10 ppi in removing isopropyl alcohol.

The cover plate 20 is brazed to the periphery 25 of the machined channel 19 and the foamed metal pieces of the sections 16 and 17. The inlet and outlet tubes 33 and 34, and the drain tube 35 are either brazed or welded to the appropriate openings in the cover plate 20.

Operationally, a gas, typically nitrogen or air, laden with VOCs, such as isopropyl alcohol, flows into the inlet tube 33 of the condensation plate 31. The gas in the plenum 23 is distributed across the 10 ppi foamed metal section 16. The thermoelectric modules 14 cool the 10 ppi foamed metal section 16 to the desired dew point, typically <−10° C. Any fog droplets formed in the section 16 are removed by contact with the smaller pore size (and higher density) 40 ppi foamed metal section 17. The two sections 16 and 17 form two parts of a high surface area metallic structure. The section 16 which first encounters the VOC laden gas is larger than the section 17, but has a lower surface area and lower pressure drop across the section 16. High concentrations of VOCs and fog droplets are removed here. The section 17 is smaller than the section 16, but has the highest possible surface area and pressure drop across section 16 to remove the lower concentrations of VOCs and fog droplets. The condensed VOC liquid drains by gravity down through the foamed metal sections 16 and 17 to the sloped bottom 18 by which the condensed liquid flows out to the drain tube 35.

Figure 3B:
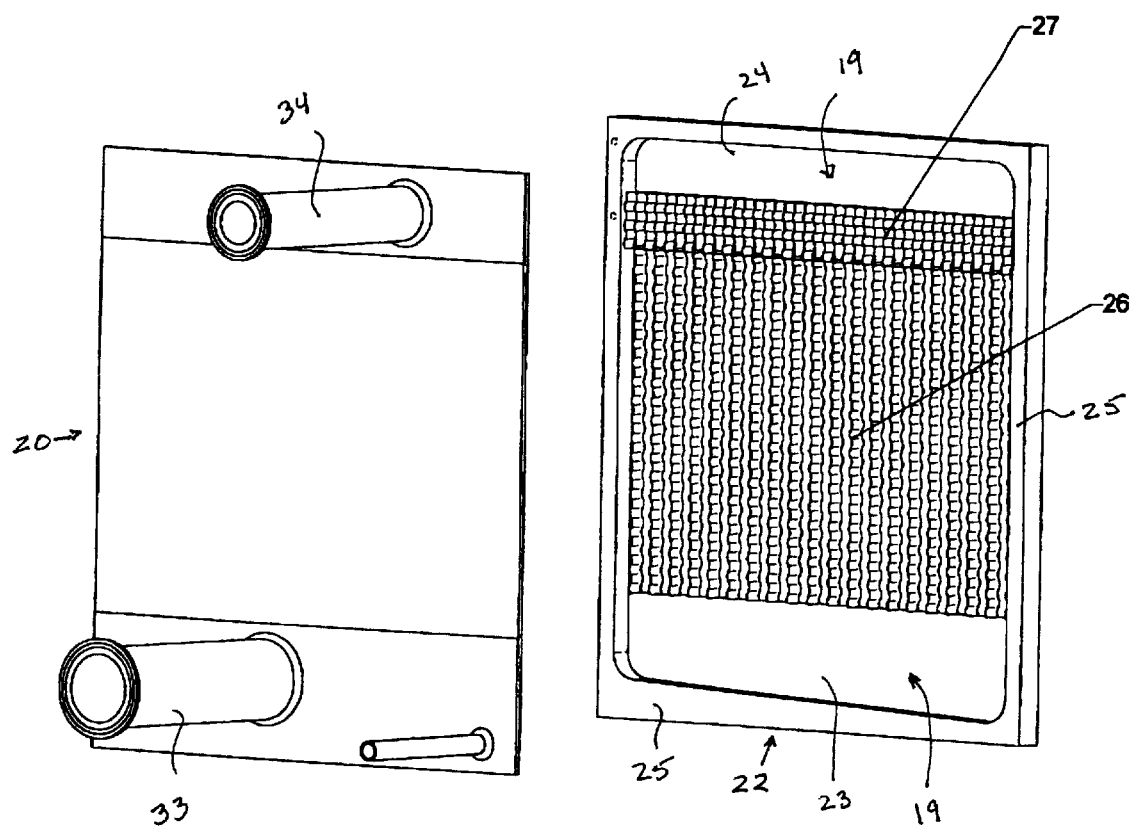
FIG. 3B is a detailed view of an alternate condensation plate in the volatile organic compound removal system.

Alternatively, the high surface area metallic structure of the foamed metal sections 16 and 17 in the condensation plate can be replaced by two sections of metal fins 26 and 27 which are brazed to the metallic base 22 of the condensation plate 31, as illustrated in FIG. 3B. Metal fin section 26 has a first fin density and metal fin section 27 has a second fin density, greater than that of section 26. Metal fin sections 26 and 27 perform the same functions as foamed metal sections 16 and 17, respectively. In one example, section 26 has wavy fins with parameters at 20 fins per inch density, 0.375 inch amplitude and 0.006 inch thickness, or lanced off-set fins with parameters at 20 fins per inch density, 0.125 off-set and 0.006 inch thickness. Section 27 has wavy fins at 42 fins per inch density, 0.375 inch amplitude, 0.006 inch thickness, or with lanced off-set fins at 20 fins per inch density, 0.125 inch off-set, 0.006 inch thickness but rotated 90° (so as to be perpendicular to the gas flow). Such exemplary fin sections have been found to be effective in removing isopropyl alcohol from nitrogen.

Tests conducted with the foamed metal embodiment of the present invention on a inlet stream of 50% isopropyl alcohol in a nitrogen flow of 100–400 cubic feet per minute and using thermoelectric devices as the source of cooling have achieved the surprising results of outlet concentrations of 400 ppm IPA, or a dew point of −30° C. without fog formation, a concentration previously unreachable without using an absorption media. Furthermore, the assembly is compact with dimensions no more than 16 inches wide by 13 inches tall by 3 inches deep. Additionally, by adjusting the pore per inch density and/or the relative dimensions of the sections 16 and 17, the present invention is flexible in operation in allowing a wide range of inlet gas flow rates and VOC concentrations.

Therefore, while the description above provides a full and complete disclosure of the preferred embodiments of the present invention, various modifications, alternate constructions, and equivalents will be obvious to those with skill in the art. For example, metallic fins brazed to the sides of the machined channel 19 might be used in place of the foamed metal. The density of the fins are used to define the surface area-to-volume ratio. Thus, the scope of the present invention is limited solely by the metes and bounds of the appended claims.

What is claimed is:

1. A compact, volatile organic compound removal system, comprising
    a metal condensation plate having
        a first metal plate and a second metal plate defining a channel therebetween;
        an inlet in said condensation plate for introducing a gas carrying volatile organic compound vapors into said channel;
        a high surface area metallic structure in said channel in intimate contact with said first and second metal plates;
        an outlet in said condensation plate for removing said gas from said channel;
        a drain in said condensation plate for removing volatile organic compound condensates from said channel; and
    a cooling source in intimate thermal contact with said metal condensation plate for cooling at least one of said first and second metal plates and said high surface area metallic structure so that said volatile organic compound vapors condense on said high surface area metallic structure to be removed from said gas.

2. The system of claim 1 wherein said high surface metallic structure comprises foamed metal in said channel between said inlet and said outlet.

3. The system of claim 2 wherein said foamed metal is brazed to at least one of said first and second metal plates.

4. The system of claim 2 wherein said foamed metal comprising a first section toward said inlet, said first section having a first pore density; and a second section toward said outlet, said second section having a second pore density greater than said first pore density.

5. The system of claim 4 wherein said first section has a first pore density of 10 pores per inch.

6. The system of claim 5 wherein said second section has a second pore density of 40 pores per inch.

7. The system of claim 1 wherein said channel has a plenum between said high surface area metallic structure and said inlet.

8. The system of claim 1 wherein said high surface metallic structure comprises metal fins.

9. The system of claim 8 wherein said metal fins are brazed to said to at least one of said first and second metal plates.

10. The system of claim 8 wherein said metal fins comprise a first section toward said inlet, said first section having a first fin density; and a second section toward said outlet, said second section having a second fin density, said second fin density greater than said first fin density.

11. The system of claim 1 wherein said at least one cooling source comprises a first cold plate cooled by water; and a first plurality of thermoelectric devices between, and in thermal intimate contact with, said metal condensation plate and said first cold plate.

12. The system of claim 11 wherein said at least one cooling source further comprises a second cold plate cooled by water, said second cold plate opposite said first cold plate with respect to said metal condensation plate; and a second plurality of thermoelectric devices between, and in intimate thermal contact with, said metal condensation plate and said second cold plate.

13. The system of claim 1 wherein said at least one cooling source comprises a first cold plate cooled by a refrigerant, said first cold plate in thermal intimate contact with said metal condensation plate.

14. The system of claim 13 wherein said at least one cooling source further comprises a second cold plate cooled by said refrigerant, said second cold plate opposite said first cold plate with respect to, and in intimate thermal contact with, said metal condensation plate.

15. The system of claim 1 wherein said at least one cooling source comprises a first metal tube cooled by a refrigerant, said first metal tube fixed to, and in thermal contact with, said metal condensation plate.

16. The system of claim 15 wherein said at least one cooling source further comprises a second metal tube cooled by said refrigerant, said second metal tube fixed to, and in thermal contact with, said metal condensation plate, said second metal tube opposite said first metal tube with respect to said metal condensation plate.

* * * * *